(No Model.)

J. D. HULL.
TROLLEY CAR.

No. 597,467. Patented Jan. 18, 1898.

WITNESSES
C. Nordfors
C. Gerst

INVENTOR
Jeremiah D. Hull.
BY
Edgar Tate & Co.
ATTORNEYS.

UNITED STATES PATENT OFFICE.

JEREMIAH D. HULL, OF NEW YORK, N. Y.

TROLLEY-CAR.

SPECIFICATION forming part of Letters Patent No. 597,467, dated January 18, 1898.

Application filed February 1, 1897. Serial No. 621,539. (No model.)

*To all whom it may concern:*

Be it known that I, JEREMIAH D. HULL, a citizen of the United States, and a resident of New York, in the county of New York and State of New York, have invented certain new and useful Improvements in Trolley-Cars, of which the following is a specification, reference being had to the accompanying drawings, forming a part thereof, in which similar numerals of reference indicate corresponding parts wherever found throughout the several views.

This invention relates to trolley-cars, and to that class thereof which are operated by overhead conductors; and the object of the invention is to provide an improved device for controlling and manipulating the trolley-pole and to prevent injury to the conductor or its supports or to cross-wires connected therewith, as well as to the trolley-pole itself, whenever the trolley flies off or leaves the conductor-wire, a further object being to provide a device of this class for holding the rope or cord by which the trolley-pole is manipulated under sufficient tension at all times to keep it out of the way of passengers entering or passing from the car, and which is also designed to prevent the jumping of the trolley-pole upwardly a considerable distance past the conductor-wire when from any cause it escapes from said wire or its connection therewith is broken.

The invention is fully disclosed in the following specification, of which the accompanying drawings form a part, in which—

Figure 1:
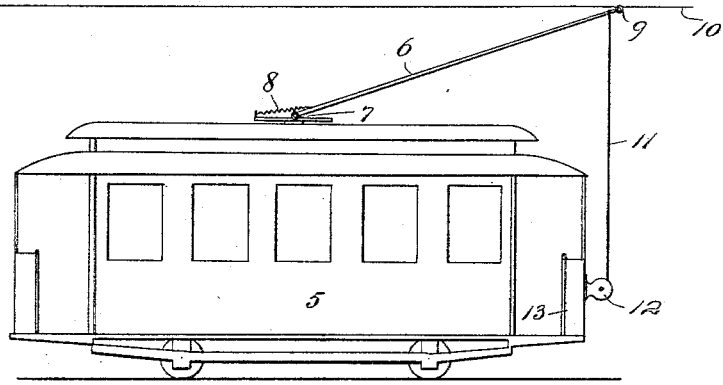
Figure 2:
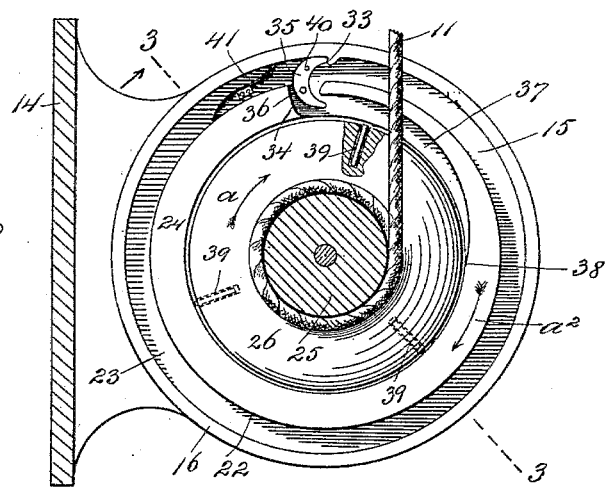
Figure 3:
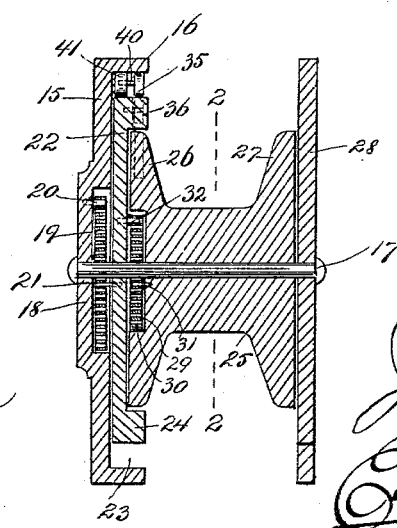

Figure 1 is a side view of a trolley-car provided with my improvement; Fig. 2, a section of the device which I employ, taken on the line 2 2 of Fig. 3; and Fig. 3, a section thereof on the line 3 3 of Fig. 2.

In the drawings forming part of this specification I have shown at 5 an ordinary trolley-car, which is provided with a trolley-pole 6, which is pivotally connected with the car at 7, and to which is secured a strong spiral spring 8, which is adapted to throw the free end of the pole upwardly in the usual manner, so as to bring the trolley 9 into contact with the conductor-wire 10, and secured to the free end of the trolley-pole adjacent to the trolley 9 is the usual cord or rope 11, which is under the control of the conductor, as usual in this class of devices; and in the practice of my invention I provide a device of the class hereinbefore referred to and adapted to serve for the purposes specified, which is represented in Fig. 1 by the reference-numeral 12 and which is secured to the dashboard 13, centrally thereof.

This device consists of a plate or other support 14, which is adapted to be secured to the dashboard and to which is secured a circular head 15, which is provided at its outer edge with an annular outwardly-directed flange or rim 16, and passing centrally therethrough is a shaft 17, and formed around said shaft in the head 15 and on the side thereof, on which the annular flange or rim 16 is formed is a circular chamber or recess 18, in which is mounted a strong spiral spring 19, one end of which is secured to a pin 20, which is secured to the head 15, and the other end of which is secured to a corresponding pin or projection 21, formed on or secured to a circular disk or plate 22, which is mounted on the shaft 17 adjacent to the circular head 15 and within the annular flange or rim 16, formed thereon.

Between the circular plate or disk 22 and the annular flange or rim 16 is a narrow annular space 23, and formed on said circular disk or plate 22 is a wide annular flange or rim 24, within which is mounted a spool 25, provided with the heads 26 and 27, the first of which is within the annular flange or rim 24 on the disk or plate 22, and said spool is held upon the shaft 17 by a disk or plate 28, which is of about the same diameter as the head 15, secured to the plate or support 14.

Formed in the outer side of the head 26 of the spool 25 is an annular chamber 29, in which is mounted a spiral spring 30, one end of which is secured to the spool 31 and the other to the disk or plate 22 at 32 by means of a pin or projection formed on or secured to said disk or plate, and at the upper side of the flange or rim 16 on the head 15 is an inwardly-directed shoulder or projection 33, and formed in the outer upper side of the flange or rim 24 is a transverse slot or opening 34, in which is pivoted a dog 35, which is semicircular in form, the pivot-pin 36 of which passes into the disk or plate 22.

Both ends of the dog 35 are directed outwardly, and formed in the inner side of the flange or rim 24 adjacent to said dog is a long segmental or circular groove 37, by which a corresponding space is formed which gradually decreases in width from the top 35 outwardly until it terminates at 38.

Mounted in the head 26 of the spool 25 are radially-movable plugs 39, three of which are preferably employed and arranged at equal distances apart, as clearly shown in Fig. 2, and said plugs are designed to operate in connection with said dog, as hereinafter described, and said dog 35 is provided near its upper end with a pin or plug 40, which projects backwardly in the direction of the head 15, and secured to said head 15 is a spring 41, one end of which bears upon the flange or rim 16 of the head 15 and the other upon the perimeter of the disk or plate 22.

In practice the lower end of the rope or cord 11 is secured to and wound upon the spool 25, as shown in Fig. 2, and the spiral springs 19 and 30 are in the operation of the device always wound up, and the spring 19 is much stronger than the spring 30, and by reason of the fact that the spring 30 is wound up the tendency thereof, as will be understood, is to unwind whenever there is any slack in the cord or rope 11, and by reason of this fact the slack in said cord or rope is always taken up. The operation of the spring 30 is therefore to revolve the spool 25 in the direction of the arrow $a$ in Fig. 1, while the operation of the spring 19, which is much stronger than the spring 30, is to revolve the disk or plate 22 in the direction of the arrow $a^2$, and if at any time the trolley should become disconnected from the conductor-wire 10 and the free end of the trolley-pole 6 be thrown upwardly by the spring 8 the spool 25 will be quickly turned in the direction of the arrow $a$, one of the radial plugs 39 will be thrown outwardly, and operating in connection with the dog 35 will disconnect it from the shoulder or projection 33, and the spring 19 will revolve the disk or plate 22 in the direction of the arrow $a^2$, thus turning the spool 25 in the same direction, and the free end of the trolley-pole will be drawn downwardly below the trolley-wire and below its supports or any cross-wires connected therewith, and the free end of the pole will remain in this position until the cord or rope 11 is pulled upwardly by the conductor, this operation resulting in turning the disk or plate 22 backwardly against the operation of the spring 19, in which operation the pin 40 on upper end of the dog 35 passes beneath the lower end of the spring 41, and when the rope or cord 11 is released by the conductor the spring 19 will again turn the disk or plate 22 into the position shown in Fig. 2, in which operation the pin 40 on the dog 35 passes over the upper end of the spring 41, and the dog is returned to the position shown in said figure or into contact with the shoulder or projection 33, which again restores the parts to their normal position. It will thus be seen that when the parts are in their normal positions the spool 29 serves simply to take up the slack in the rope or cord 32 and that when the trolley is disconnected from the trolley-wire and thrown upwardly above the same the spring 19 immediately draws the free end of the trolley-pole downwardly below said conductor and below its supports and any cross-wires connected therewith and holds it in this position until the cord or rope 11 is manipulated by the conductor and the connection between the conductor-wire and the trolley-wire again made.

It will be understood that this device is detachably connected with the dashboard 13 and may be removed therefrom and placed upon the opposite end of the car whenever desired, and this connection may be made in any desirable manner or in the same way in which similar devices have heretofore been connected with cars. It will also be understood that it is almost instantaneous in action, the trolley rope or cord 11 being always kept in a state of tension and in condition to respond to the slightest movement of the spool when the spring 30 acts, and this is also true of the disk or plate 22, and it will further be understood that the necessary movement of the spool and the disk or head 22 is always very slight, the spool being preferably about six inches in diameter and less than a complete revolution thereof being sufficient to take up any slack in the rope or cord 11, while the necessary movement of the disk or plate 22 is also usually less than a single revolution.

Having fully described my invention, I claim as new and desire to secure by Letters Patent—

1. The herein-described attachment for controlling and manipulating the pole of a trolley-car, which consists of a support, provided with a circular head, and adapted to be secured to either end of the car, a shaft passing centrally through said head, a revoluble disk mounted on said shaft adjacent to said head, a spool mounted on said shaft adjacent to said disk, a spring mounted at each side of said disk, one end of one of said springs being secured to said spool and the other to said disk, and one end of the other spring being secured to said disk, and the other to said head, and a locking device for locking the disk to the head so as to prevent the revolution thereof, and devices connected with the spool for releasing said locking devices and operatively engaging said disk, substantially as shown and described.

2. The herein-described attachment for controlling and manipulating the pole of a trolley-car, which consists of a support, provided with a circular head, and adapted to be secured to either end of the car, a shaft passing centrally through said head, a revoluble disk mounted on said shaft, adjacent to said head, a spool mounted on said shaft, adjacent to said disk, a spring mounted at each side of said disk, one end of one of said springs being secured to said spool, and the other to said disk, and one end of the other spring being secured to said disk, and the other to said head, a locking device for locking the disks to the head so as to prevent the revolution thereof, and devices connected with the spool for releasing said locking devices and operatively engaging said disk, and said disk and said spool being adapted to revolve in the same direction, substantially as shown and described.

In testimony that I claim the foregoing as my invention I have signed my name, in presence of the subscribing witnesses, this 14th day of September, 1896.

JEREMIAH D. HULL.

Witnesses:
W. W. HILL,
CHARLES S. ROGERS.